(12) United States Patent
Ogawa et al.

(10) Patent No.: US 7,284,275 B2
(45) Date of Patent: Oct. 16, 2007

(54) INFORMATION PLAYBACK APPARATUS METHOD AND RECORDING MEDIUM

(75) Inventors: Shigeho Ogawa, Kanagawa (JP); Hiromasa Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 761 days.

(21) Appl. No.: 09/808,492

(22) Filed: Mar. 14, 2001

(65) Prior Publication Data

US 2001/0037459 A1   Nov. 1, 2001

(30) Foreign Application Priority Data

Mar. 15, 2000  (JP) .............................. 2000-071382

(51) Int. Cl.
  *G06F 7/04* (2006.01)
  *G06F 17/30* (2006.01)

(52) U.S. Cl. .......................... 726/26; 726/27; 726/28; 713/164; 713/165; 713/166; 713/182; 725/26; 725/28

(58) Field of Classification Search ................ 713/201, 713/165, 200, 164, 166, 182; 725/28, 25, 725/26; 386/95, 46; 726/26, 27, 28
See application file for complete search history.

(56) References Cited

U.S. PATENT DOCUMENTS

| 5,596,639 A | * | 1/1997 | Kikinis ........................ 705/52 |
| 5,621,456 A | * | 4/1997 | Florin et al. ................... 725/43 |
| 6,035,329 A | * | 3/2000 | Mages et al. ................ 709/217 |
| 6,169,543 B1 | * | 1/2001 | Wehmeyer ..................... 725/47 |
| 6,215,746 B1 | * | 4/2001 | Ando et al. ................. 369/53.2 |
| 6,216,228 B1 | * | 4/2001 | Chapman et al. ............ 713/176 |
| 6,385,388 B1 | * | 5/2002 | Lewis et al. ................... 386/94 |
| 6,425,081 B1 | * | 7/2002 | Iwamura ...................... 713/176 |
| 6,675,384 B1 | * | 1/2004 | Block et al. ................... 725/28 |
| 6,732,367 B1 | * | 5/2004 | Ellis et al. ..................... 725/27 |
| 6,735,699 B1 | * | 5/2004 | Sasaki et al. ................ 713/200 |
| 6,760,915 B2 | * | 7/2004 | deCarmo ...................... 725/28 |
| 6,895,170 B1 | * | 5/2005 | Lambert et al. ............... 386/95 |
| 2002/0057893 A1 | * | 5/2002 | Wood et al. ................... 386/46 |
| 2003/0126445 A1 | * | 7/2003 | Wehrenberg ................ 713/176 |
| 2003/0172286 A1 | * | 9/2003 | Gotoh et al. ................. 713/193 |

* cited by examiner

*Primary Examiner*—Kim Vu
*Assistant Examiner*—Beemnet W Dada
(74) *Attorney, Agent, or Firm*—Frommer Lawrence & Haug LLP; William S. Frommer; Thomas F. Presson

(57) ABSTRACT

The invention provides an information playback apparatus and method by which enjoyment of a DVD can be restricted with certainty. A disk ID of a DVD video whose enjoyment is to be restricted and a password are stored in a corresponding relationship to each other in a flash ROM. When the DVD video of the disk ID stored in the flash ROM is loaded, a controller permits playback of the DVD video only if the corresponding password is inputted.

17 Claims, 16 Drawing Sheets

FIG.17

| VIDEO MANAGER INFORMATION (VMGI) (ESSENTIAL) |
| VIDEO OBJECT SET FOR VMG MENU (VMGM_VOBS) (OPTIONAL) |
| BACKUP OF VIDEO MANAGER INFORMATION (VMGI_BUP) (ESSENTIAL) |

| VIDEO MANAGER INFORMATION MANAGEMENT TABLE (VMGI_MAT) (ESSENTIAL) |
| TITLE SERCH POINTER TABLE (TT_SRPT) (ESSENTIAL) |
| VIDEO MANAGER MENU PGCI UNIT TABLE (VMGM_PGCI_UT) (ESSENTIAL WHEN VMGM_VOBS IS PRESENT) |
| PARENTAL MANAGEMENT INFORMATION TABLE (PTL_MAIT) (OPTIONAL) |
| VIDEO TITLE SET ATTRIBUTE INFORMATION TABLE (VTS_ATRT) (ESSENTIAL) |
| TEXT DATA MANAGER (TXTDT_MG) (OPTIONAL) |
| VIDEO MANAGER MENU CELL ADDRESS TABLE (VMGM_C_ADT) (ESSENTIAL WHEN VMGM_VOBS IS PRESENT) |
| VIDEO MANAGER MENU VIDEO OBJECT UNIT ADDRESS MAP (VMGM_VOBU_ADMAP) (ESSENTIAL WHEN VMGM_VOBS IS PRESENT) |

FIG. 18

| RBP | | CONTENTS | BYTE NUMBER |
|---|---|---|---|
| 0 to 11 | VMG_ID | VMG IDENTIFIER | 12 BYTES |
| 12 to 15 | VMG_EA | END ADDRESS OF VMG | 4 BYTES |
| 16 to 27 | reserved | reserved | 12 BYTES |
| 28 to 31 | VMGI_EA | END ADDRESS OF VMGI | 4 BYTES |
| 32 to 33 | VERN | VERSION NUMBER OF DVD VIDEO SPECIFICATIONS | 2 BYTES |
| 34 to 37 | VMG_CAT | VIDEO MANAGER CATEGORY | 4 BYTES |
| 38 to 45 | VLMS_ID | VOLUME SET IDENTIFIER | 8 BYTES |
| 46 to 61 | reserved | reserved | 16 BYTES |
| 62 to 63 | VTS_Ns | VIDEO TITLE SET NUMBER | 2 BYTES |
| 64 to 95 | PVR_ID | IDENTIFIER UNIQUE TO PROVIDER | 32 BYTES |
| 96 to 103 | POS_CD | POS CODE | 8 BYTES |
| 104 to 127 | reserved | reserved | 24 BYTES |
| 128 to 131 | VMGI_MAT_EA | END ADDRESS OF VMGI_MAT | 4 BYTES |
| 132 to 135 | FP_PGCI_SA | TOP ADDRESS OF FP_PGCI | 4 BYTES |
| 136 to 191 | reserved | reserved | 56 BYTES |
| 192 to 195 | VMGM_VOBS_SA | TOP ADDRESS OF VMGM_VOBS | 4 BYTES |
| 196 to 199 | TT_SRPT_SA | TOP ADDRESS OF TT_SRPT | 4 BYTES |
| 200 to 203 | VMGM_PGCI_UT_SA | TOP ADDRESS OF VMGM_PGCI_UT | 4 BYTES |
| 204 to 207 | PTL_MAIT_SA | TOP ADDRESS OF PTL_MAIT | 4 BYTES |
| 208 to 211 | VTS_ATRT_SA | TOP ADDRESS OF VTS_ATRT | 4 BYTES |
| 212 to 215 | TXTDT_MG_SA | TOP ADDRESS OF TXTDT_MG | 4 BYTES |
| 216 to 219 | VMGM_C_ADT_SA | TOP ADDRESS OF VMGM_C_ADT | 4 BYTES |
| 220 to 223 | VMGM_VOBU_ADMAP_SA | TOP ADDRESS OF VMGM_VOBU_ADMAP | 4 BYTES |
| 224 to 255 | reserved | reserved | 32 BYTES |
| 256 to 257 | VMGM_V_ATR | VIDEO ATTRIBUTE OF VMGM | 2 BYTES |
| 258 to 259 | VMGM_AST_Ns | AUDIO STREAM NUMBER OF VMGM | 2 BYTES |
| 260 to 267 | VMGM_AST_ATR | AUDIO STREAM ATTRIBUTE OF VMGM | 8 BYTES |
| 268 to 323 | reserved | reserved | 56 BYTES |
| 324 to 339 | reserved | reserved | 16 BYTES |
| 340 to 341 | VMGM_SPST_Ns | SUB PICTURE STREAM NUMBER OF VMGM | 2 BYTES |
| 342 to 347 | VMGM_SPST_ATR | SUB PICTURE STREAM ATTRIBUTE OF VMGM | 6 BYTES |
| 348 to 1023 | reserved | reserved | 676 BYTES |
| 1024 to 2291(max.) | FP_PGCI | FIRST PLAY PGCI | 0 or (236 to 1268) BYTES |

FIG. 19

| VIDEO TITLE SET INFORMATION (VTSI) | (ESSENTIAL) |
|---|---|
| VIDEO OBJECT SET FOR VIDEO TITLE SET MENU (VTSM_VOBS) | (OPTIONAL) |
| VIDEO OBJECT SET FOR VIDEO TITLE SET TITLE (VTSTT_VOBS) | (ESSENTIAL) |
| BACKUP OF VIDEO TITLE SET INFORMATION (VTSI_BUP) | (ESSENTIAL) |

| VIDEO TITLE SET INFORMATION MANAGEMENT TABLE (VTSI_MAT) | (ESSENTIAL) |
|---|---|
| VIDEO TITLE SET PTT SEARCH POINTER TABLE (VTS_PTT_SRPT) | (ESSENTIAL) |
| VIDEO TITLE SET PROGRAM CHAIN INFORMATION TABLE (VTS_PGCIT) | (ESSENTIAL) |
| VIDEO TITLE SET MENU PGCI UNIT TABLE (VTSM_PGCI_UT) | (ESSENTIAL WHEN VTSM_VOBS IS PRESENT) |
| VIDEO TITLE SET TIME MAP TABLE (VTS_TMAPT) | (OPTIONAL) |
| VIDEO TITLE SET MENU CELL ADDRESS TABLE (VTSM_C_ADT) | (ESSENTIAL WHEN VTSM_VOBS IS PRESENT) |
| VIDEO TITLE SET MENU VIDEO OBJECT UNIT ADDRESS MAP (VTSM_VOBU_ADMAP) | (ESSENTIAL WHEN VMGM_VOBS IS PRESENT) |
| VIDEO TITLE SET CELL ADDRESS TABLE (VTS_C_ADT) | (ESSENTIAL) |
| VIDEO TITLE SET VIDEO OBJECT UNIT ADDRESS MAP (VTS_VOBU_ADMAP) | (ESSENTIAL) |

FIG. 20

| RBP | | CONTENTS | BYTE NUMBER |
|---|---|---|---|
| 0 to 11 | VTS_ID | VTS IDENTIFIER | 12 BYTES |
| 12 to 15 | VTS_EA | END ADDRESS OF VTS | 4 BYTES |
| 16 to 27 | reserved | reserved | 12 BYTES |
| 28 to 31 | VTSI_EA | END ADDRESS OF VTSI | 4 BYTES |
| 32 to 33 | VERN | VERSION NUMBER OF DVD VIDEO SPECIFICATIONS | 2 BYTES |
| 34 to 37 | VTS_CAT | VTS CATEGORY | 4 BYTES |
| 38 to 127 | reserved | reserved | 90 BYTES |
| 128 to 131 | VTSI_MAT_EA | END ADDRESS OF VTSI_MAT | 4 BYTES |
| 132 to 191 | reserved | reserved | 60 BYTES |
| 192 to 195 | VTSM_VOBS_SA | TOP ADDRESS OF VTSM_VOBS | 4 BYTES |
| 196 to 199 | VTSTT_VOBS_SA | TOP ADDRESS OF VTSTT_VOBS | 4 BYTES |
| 200 to 203 | VTS_PTT_SRPT_SA | TOP ADDRESS OF VTS_PTT_SRPT | 4 BYTES |
| 204 to 207 | VTS_PGCIT_SA | TOP ADDRESS OF VTS_PGCIT | 4 BYTES |
| 208 to 211 | VTSM_PGCI_UT_SA | TOP ADDRESS OF VTSM_PGCI_UT | 4 BYTES |
| 212 to 215 | VTS_TMAPT_SA | TOP ADDRESS OF VTS_TMAPT | 4 BYTES |
| 216 to 219 | VTSM_C_ADT_SA | TOP ADDRESS OF VTSM_C_ADT | 4 BYTES |
| 220 to 223 | VTSM_VOBU_ADMAP_SA | TOP ADDRESS OF VTSM_VOBU_ADMAP | 4 BYTES |
| 224 to 227 | VTS_C_ADT_SA | TOP ADDRESS OF VTS_C_ADT | 4 BYTES |
| 228 to 231 | VTS_VOBU_ADMAP_SA | TOP ADDRESS OF VTS_VOBU_ADMAP | 4 BYTES |
| 232 to 255 | reserved | reserved | 24 BYTES |
| 256 to 257 | VTSM_V_ATR | VIDEO ATTRIBUTE OF VTSM | 2 BYTES |
| 258 to 259 | VTSM_AST_Ns | AUDIO STREAM NUMBER OF VTSM | 2 BYTES |
| 260 to 267 | VTSM_AST_ATR | AUDIO STREAM ATTRIBUTE OF VTSM | 8 BYTES |
| 268 to 323 | reserved | reserved | 56 BYTES |
| 324 to 339 | reserved | reserved | 16 BYTES |
| 340 to 341 | VTSM_SPST_Ns | SUB PICTURE STREAM NUMBER OF VTSM | 2 BYTES |
| 342 to 347 | VTSM_SPST_ATR | SUB PICTURE STREAM ATTRIBUTE OF VTSM | 6 BYTES |
| 348 to 511 | reserved | reserved | 164 BYTES |
| 512 to 513 | VTS_V_ATR | VIDEO ATTRIBUTE OF VTS | 2 BYTES |
| 514 to 515 | VTS_AST_Ns | AUDIO STREAM NUMBER OF VTS | 2 BYTES |
| 516 to 579 | VTS_AST_ATRT | AUDIO STREAM ATTRIBUTE TABLE OF VTS | 64 BYTES |
| 580 to 595 | reserved | reserved | 16 BYTES |
| 596 to 597 | VTS_SPST_Ns | SUB PICTURE STREAM NUMBER OF VTS | 2 BYTES |
| 598 to 789 | VTS_SPST_ATRT | SUB PICTURE STREAM ATTRIBUTE TABLE OF VTS | 192 BYTES |
| 790 to 791 | reserved | reserved | 2 BYTES |
| 792 to 983 | VTS_MU_AST_ATRT | MULTI-CHANNEL AUDIO STREAM ATTRIBUTE TABLE OF VTS | 192 BYTES |
| 984 to 1023 | reserved | reserved | 40 BYTES |
| 1024 to 2047 | reserved | reserved | 1024 BYTES |

INFORMATION PLAYBACK APPARATUS METHOD AND RECORDING MEDIUM

BACKGROUND OF THE INVENTION

This invention relates to an information playback apparatus and method as well as a recording medium, and more particularly to an information playback apparatus and method as well as a recording medium wherein, where a scene which is not preferable for children to see such as a scene of violence is recorded on a disk, the disk can be prevented from being played back.

A DVD (Digital Versatile Disk or Digital Video Disk) on which image information is recorded has been and is being popularized recently. The DVD sometimes has information regarding parental lock recorded thereon. If a parental level for the parental lock is set to the DVD, then only those who know a password set in advance can enjoy video information recorded on the DVD.

A conventional DVD player executes such a playback process as illustrated in a flow chart of FIG. 1. Referring to FIG. 1, first in step S1, the DVD player reads out a parental level recorded on a disk (DVD) from the disk. The parental level is set in advance by a manufacturer of the DVD.

In step S2, the DVD player discriminates whether or not a parental level is read out. If a parental level is read out, then the processing advances to step S3, in which the DVD player reads out a parental level stored in the DVD player itself.

In step S4, the DVD player compares the parental level read out from the disk in step S1 and the parental level stored in the DVD player itself and read out in step S3 with each other to discriminate whether or not the parental level of the DVD player is severer than the parental level of the disk. If the parental level of the DVD player is severer than the parental level of the disk, then the processing advances to step S5, in which the DVD player causes a password inputting screen to be displayed. When the password inputting screen is displayed, a user will input a password to the DVD player. The password is usually known only to a parent who owns the DVD player but not known to a child. Accordingly, the parent can input the correct password, but the child cannot input the correct password.

In step S6, the DVD player waits until a password is inputted, and when a password is inputted, the processing advances to step S7, in which it is discriminated whether or not the inputted password is correct. If the inputted password is correct, then the processing advances to step S8, in which the DVD player plays back the disk in a normal manner. On the contrary if it is discriminated in step S7 that the inputted password is not correct, then the processing advances to step S9, in which the DVD player executes controlled or restricted playback.

In the normal playback process, for example, scenes B suitable for adults are played back and displayed next to a scene A as seen in FIG. 2, and then a further scene D is played back and displayed. On the other hand, in the controlled playback process, a scene C suitable for children is played back and displayed next to the scene A, and then the scene D is played back and displayed. Accordingly, a child who does not know the password cannot enjoy the scenes B which are suitable for adults.

If it is discriminated in step S4 that the parental level of the DVD player is not severer than the parental level of the disk, then the processing advances to step S8, in which a normal playback process is executed immediately. In particular, if the parent considers that its child may enjoy a disk which includes some violent scenes from the reason that the child is not too young or from some other reason, then the parent will set the parental level of the DVD player to a comparatively low value. In such an instance as just described, the disk can be played back in a normal manner.

Also when it is discriminated in step S2 that a parental level is not read out from the reason that the DVD disk has no parental level recorded thereon or from some other reason, the processing advances to step S8, in which normal playback of the DVD disk is performed.

In this manner, the conventional DVD player can inhibit a DVD disk from being played back normally by a child or the like who does not know a password if a parental level is set to the disk. However, the conventional DVD player is disadvantageous in that, where a parental level is not recorded on a DVD disk, the DVD player cannot restrict enjoyment of the DVD disk even where the DVD disk includes an image of a scene whose enjoyment by children is not desirable.

Similarly, the conventional DVD player is disadvantageous in that, even if a parental level is recorded on a DVD disk, if the set parental level of the DVD disk is comparatively indulgent and the DVD includes images whose enjoyment by children is not desirable, the DVD player cannot restrict enjoyment of the disk unless the parental level stored in the DVD player is changed to a severer level.

SUMMARY OF THE INVENTION

It is an object of the present invention to provide an information playback apparatus and method as well as a recording medium by which enjoyment of a DVD can be restricted with certainty.

In order to attain the object described above, according to an aspect of the present invention, there is provided an information playback apparatus for playing back a recording medium on which image information is recorded, comprising first fetching means for fetching identification information used for identification of a recording medium, second fetching means for fetching a permission condition for permitting playback of the image information recorded on a recording medium, storage means for storing the identification information fetched by the first fetching means and the permission condition fetched by the second fetching means, extraction means for extracting the identification information recorded on a recording medium loaded in the information playback apparatus, first comparison means for comparing the identification information extracted by the extraction means and the identification information stored in the storage means with each other, third fetching means for fetching a permission condition when the identification information extracted by the extraction means and the identification information stored in the storage means coincide with each other, second comparison means for comparing the permission condition fetched by the third fetching means and the permission condition stored in the storage means with each other, and control means for controlling playback of the image information recorded on the recording medium in response to a result of the comparison by the second comparison means.

The permission condition may include a password. Alternatively or additionally, the permission condition may include a parental level.

According to another aspect of the present invention, there is provided an information playback method for an information playback apparatus which plays back a recording medium on which image information is recorded, comprising a first fetching step of fetching identification information used for identification of a recording medium, a second fetching step of fetching a permission condition for permitting playback of the image information recorded on a recording medium, a storage control step of controlling storage of the identification information fetched by the processing in the first fetching step and the permission condition fetched by the processing in the second fetching step, an extraction step of extracting the identification information recorded on a recording medium loaded in the information playback apparatus, a first comparison step of comparing the identification information extracted by the processing in the extraction step and the identification information whose storage has been controlled by the processing in the storage control step with each other, a third fetching step of fetching a permission condition when the identification information extracted by the processing in the extraction step and the identification information whose storage has been controlled by the processing in the storage control step coincide with each other, a second comparison step of comparing the permission condition fetched by the processing in the third fetching step and the permission condition whose storage has been controlled by the processing in the storage control step with each other, and a control step of controlling playback of the image information recorded on the recording medium in response to a result of the comparison by the processing in the second comparison step.

According to a further aspect of the present invention, there is provided a recording medium on which a computer-readable program for information playback for an information playback apparatus which plays back an information recording medium on which image information is recorded is recorded, the program comprising a first fetching step of fetching identification information used for identification of an information recording medium, a second fetching step of fetching a permission condition for permitting playback of the image information recorded on an information recording medium, a storage control step of controlling storage of the identification information fetched by the processing in the first fetching step and the permission condition fetched by the processing in the second fetching step, an extraction step of extracting the identification information recorded on an information recording medium loaded in the information playback apparatus, a first comparison step of comparing the identification information extracted by the processing in the extraction step and the identification information whose storage has been controlled by the processing in the storage control step with each other, a third fetching step of fetching a permission condition when the identification information extracted by the processing in the extraction step and the identification information whose storage has been controlled by the processing in the storage control step coincide with each other, a second comparison step of comparing the permission condition fetched by the processing in the third fetching step and the permission condition whose storage has been controlled by the processing in the storage control step with each other, and a control step of controlling playback of the image information recorded on the information recording medium in response to a result of the comparison by the processing in the second comparison step.

With the information playback apparatus and method and the program recorded on the recording medium, identification information for identification of a recording medium and a permission condition for permitting playback of image information recorded on the recording medium are stored, and a fetched permission condition and the stored permission condition are compared with each other. Then, playback of the image information recorded on the recording medium is controlled in response to a result of the comparison. Consequently, parental lock can be applied freely to the recording medium based on a discrimination of the user.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 17 is a diagrammatic view illustrating a configuration of video manager information;

FIG. 18 is a view illustrating a configuration of a video manager information management table;

FIG. 19 is a diagrammatic view illustrating a configuration of video title set information; and FIG. 20 is a view illustrating a configuration of a video title set information management table.

DETAILED DESCRIPTION OF THE PREFERRED EMBODIMENT

Figure 3:
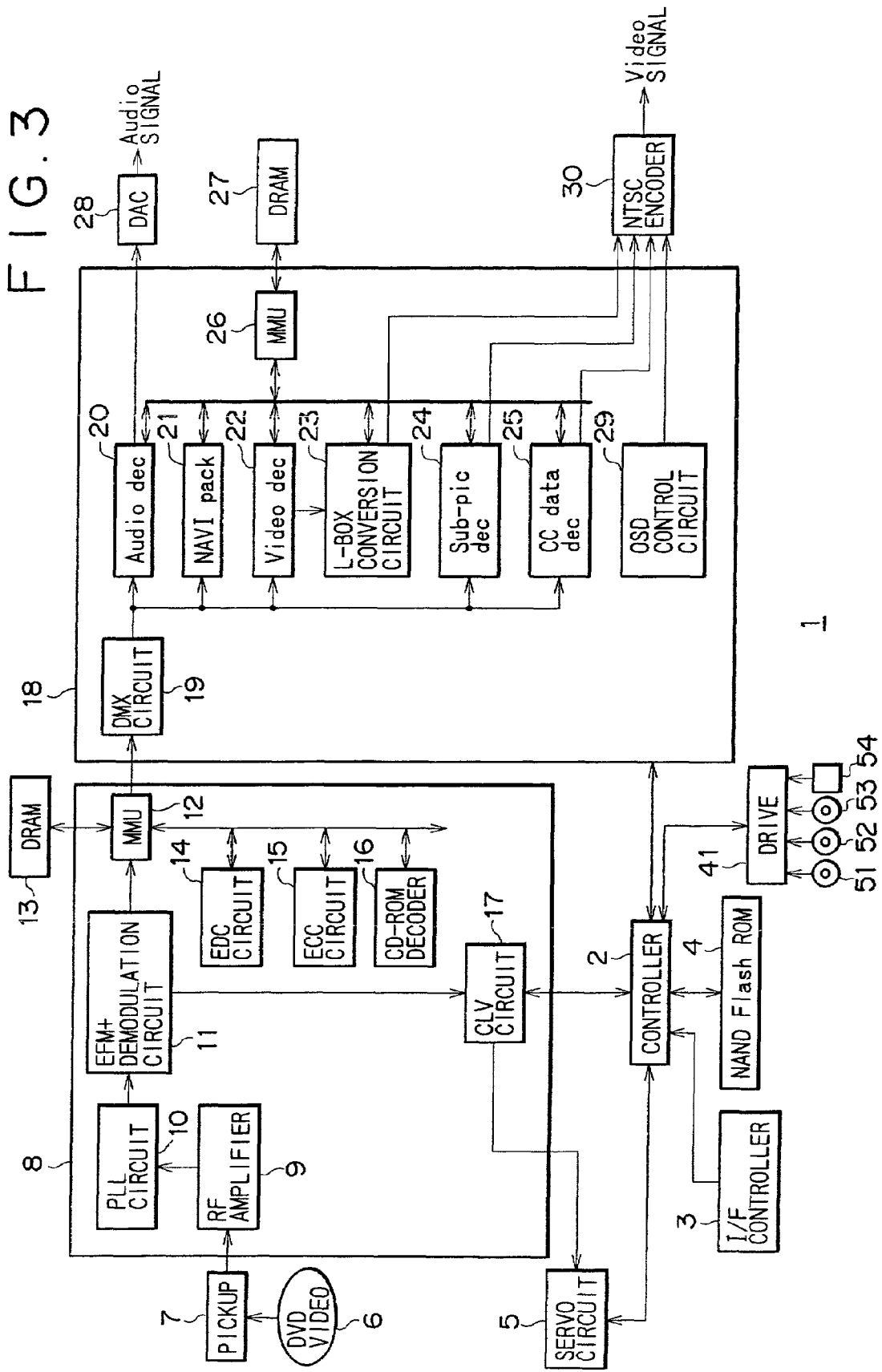
FIG. 3 is a block diagram showing an example of a construction of a DVD player to which the present invention is applied.

Referring to FIG. 3, there is shown an example of a construction of a DVD player to which the present invention is applied. The DVD player is generally denoted at 1 and includes a controller 2 which controls operation of the entire DVD player 1 in accordance with an operation command from a user inputted to an interface controller 3 or a control signal (which is hereinafter described) supplied from an AV decoder 18. The interface controller 3 detects an operation by a user of a remote controller or an operation button or a like element provided on a body of the DVD player 1 and outputs a corresponding signal to the controller 2. A flash ROM (NAND Flash ROM) 4 has stored therein a parental level set to the DVD player 1, a password, an ID as identification information of each disk, a parental level of each disk and other necessary information as parental information. A servo circuit 5 adjusts operation of a pickup 7 under the control of the controller 2. The servo circuit 5 further controls the speed of rotation of a spindle motor not shown built in the DVD player 1 so that a linear velocity error inputted from a linear velocity error detection (CLV (Constant Linear Velocity)) circuit 17 may be minimized. A DVD video 6 has video contents recorded thereon.

The pickup 7 irradiates a laser beam upon the DVD video 6 and receives reflected light from the DVD video 6 to read out information recorded on the DVD video 6 as a RF (radio frequency) signal, and outputs the RF signal to a RF amplifier 9 of a pre-processing section 8. The RF amplifier 9 digitizes and amplifies the RF signal inputted thereto from the pickup 7 and outputs a resulting signal to a PLL (Phase Locked Loop) circuit 10. The PLL circuit 10 outputs the digital input signal inputted thereto from the RF amplifier 9 and a clock signal extracted from the digital signal to an EFM (Eight-Fourteen Modulation)+demodulation circuit 11. The EFM+demodulation circuit 11 EFM+demodulates a signal inputted thereto from the PLL circuit 10 and outputs a resulting signal to a microcomputer (MMU: Memory Management Unit) 12 and a linear velocity error detection circuit 17.

A code error detection (EDC: Error Detection Code) circuit 14 detects an error of a code of a signal inputted thereto from the EFM+demodulation circuit 11 under the control of the microcomputer 12. A code error correction (ECC: Error Correction Code) circuit 15 corrects an error of a code of a signal inputted thereto from the EFM+demodulation circuit 11 under the control of the microcomputer 12 and outputs a resulting signal to a demultiplexing (DMX) circuit 19 of the AV decoder 18. A CD-ROM decoder 16 executes, when a CD-VIDEO is played back in place of the DVD video 6, predetermined decoding processing for a signal inputted thereto from the EFM+demodulation circuit 11 under the control of the microcomputer 12.

The demultiplexing circuit 19 demultiplexes a code signal inputted thereto from the pre-processing section 8 into audio data, video data, sub video data and/or navigation data, and outputs them to an audio decoder (Audio dec) 20, a video decoder (Video dec) 22, a closed caption data decoder 25, a sub-picture decoder (Sub-pic dec) 24 and/or a NAVI pack circuit 21.

The audio decoder 20 decodes audio data in a compression coded form inputted thereto from the demultiplexing circuit 19 under the control of the microcomputer (MMU) 26 and outputs the decoded audio data to a DAC (digital to analog converter) 28. The DAC 28 converts a digital audio signal inputted thereto into an analog audio signal and outputs the analog audio signal, for example, to a speaker (not shown) in the following stage.

The NAVI pack circuit 21 suitably processes navigation data inputted thereto from the demultiplexing circuit 19 under the control of the microcomputer 26 to produce a control signal and outputs the control signal to the controller 2.

The video decoder 22 decodes video data in a compression coded form inputted thereto from the demultiplexing circuit 19 under the control of a microcomputer 26 and outputs the decoded video data to a letter box (L-BOX) conversion circuit 23. The letter box conversion circuit 23 suitably performs letter box conversion of an image of video data inputted thereto from the video decoder 22 under the control of the microcomputer 26 and outputs a resulting signal to an NTSC encoder 30.

The sub-picture decoder (Sub-pic dec) 24 suitably decodes sub-picture data inputted thereto from the demultiplexing circuit 19 under the control of the microcomputer 26 and outputs resulting data to the NTSC encoder 30. The closed caption data decoder 25 suitably decodes closed caption data included in video data inputted thereto from the demultiplexing circuit 19 under the control of the microcomputer 26 and outputs resulting data to the NTSC encoder 30.

An OSD (On-Screen Display) control circuit 29 produces an OSD image under the control of the microcomputer 26 and outputs the OSD image to the NTSC encoder 30. The NTSC encoder 30 suitably superposes pictures inputted thereto from the letter box conversion circuit 23, sub-picture decoder 24, closed caption data decoder 25 and/or OSD control circuit 29 to obtain an NTSC signal and outputs the NTSC signal, for example, to a display unit (not shown) such as a CRT (cathode ray tube) in the following stage.

A pair of DRAMs (Dynamic Random Access Memories) 13 and 27 are used as areas for temporarily storing data to be processed by the microcomputers 12 and 26, respectively.

A drive 41 is connected to the controller 2. A magnetic disk 51, an optical disk 52, a magneto-optical disk 53, a semiconductor memory 54 or a like medium is loaded into the drive 41.

Now, operation of the DVD player 1 is described. First, a process for registering a level for parental lock into the DVD player 1 is described with reference to flow charts of FIGS. 4 and 5. This process is started when a user inputs an instruction for level registration to the controller 2 through the interface controller 3.

First in step S21, the controller 2 causes a menu for level registration to be displayed. Data of the menu for level registration are stored in advance in the flash ROM 4. The controller 2 reads out the data of the menu from the flash ROM 4 and supplies the data of the menu to the OSD control circuit 29. The OSD control circuit 29 produces image data from the data inputted thereto and outputs the image data to the NTSC encoder 30. The NTSC encoder 30 multiplexes the image data inputted thereto from the OSD control circuit 29 with a video signal of the NTSC system and outputs a resulting signal to the display unit like CRT not shown so that the resulting signal may be displayed on the display unit. Consequently, for example, such a level registration menu as shown in FIG. 6 is displayed.

Figure 6:
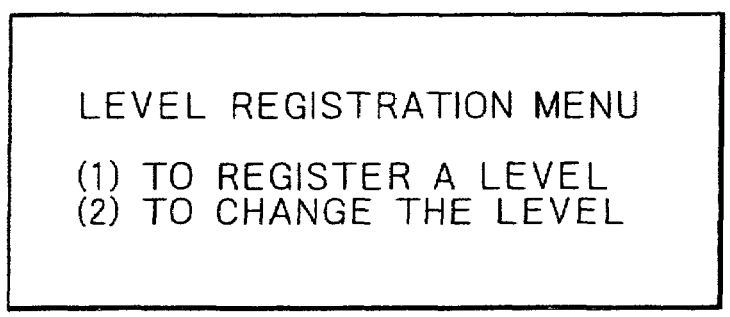
FIG. 6 is a schematic view showing an example of a level registration menu in step S21 of the flow chart of FIG. 4.
Figure 7:
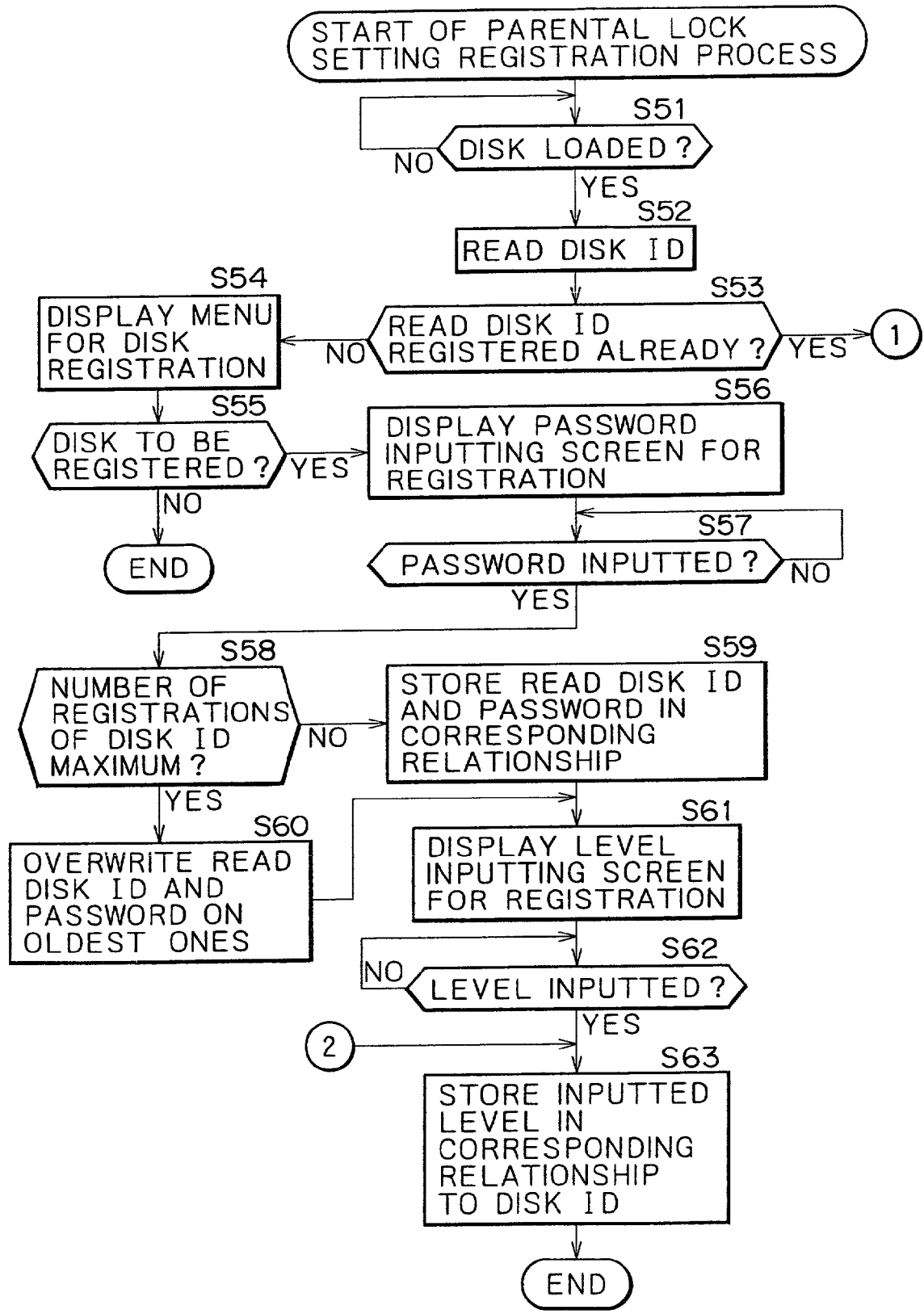
FIGS. 7 to 11 are flow charts illustrating an parental lock setting registration process of the DVD player of FIG. 3.

In the example of FIG. 6, either one of items of "(1) To register a level" and "(2) To change the level" is selected by inputting the number 1 or the number 2. Thus, the controller 2 discriminates in step S22 whether or not an instruction to select the item of "To register a level" is inputted from the interface controller 3. If it is discriminated that the instruction is not inputted, then the processing advances to step S23, in which it is discriminated whether or not the item of "To change the level" is selected. If the item of "To change the level" is not selected, then the processing returns to step S22 so that the processing beginning with step S22 is repeated.

If it is discriminated in step S22 that the item of "To register a level" is selected, then the processing advances to step S24, in which the controller 2 causes a password inputting screen to be displayed. In the flash ROM 4, data corresponding to the password inputting screen are stored in advance. Thus, the data are supplied to the OSD control circuit 29 and converted into image data by the OSD control circuit 29, and the image data are outputted to and displayed on the display unit like CRT through the NTSC encoder 30.

When the password inputting screen is displayed, the user will input a password, which the user wants to use, through the interface controller 3. Therefore, the controller 2 waits in step S25 until a password is inputted by the user, and when a password is inputted, the processing advances to step S26, in which the controller 2 causes a level inputting screen to be displayed. Also image data corresponding to the level inputting screen are stored in advance in the flash ROM 4 and supplied to the OSD control circuit 29, by which the image data are converted into image data. Thus, the image data are outputted from the NTSC encoder 30 to and displayed on the display unit.

Then, the user will input a level for parental lock to be set to the DVD player 1 through the interface controller 3. Therefore, the controller 2 waits in step S27 until a level is inputted. Then, when a level is inputted, the processing advances to step S28, in which the password and the level inputted by the user are registered into the flash ROM 4.

Through the processing described above, the user utilizes the DVD player 1 to complete the registration process of a parental level which allows enjoyment of children and the registration process of a password which is inputted when the user itself enjoys a DVD irrespective of the parental level to the DVD player 1.

Figure 5:
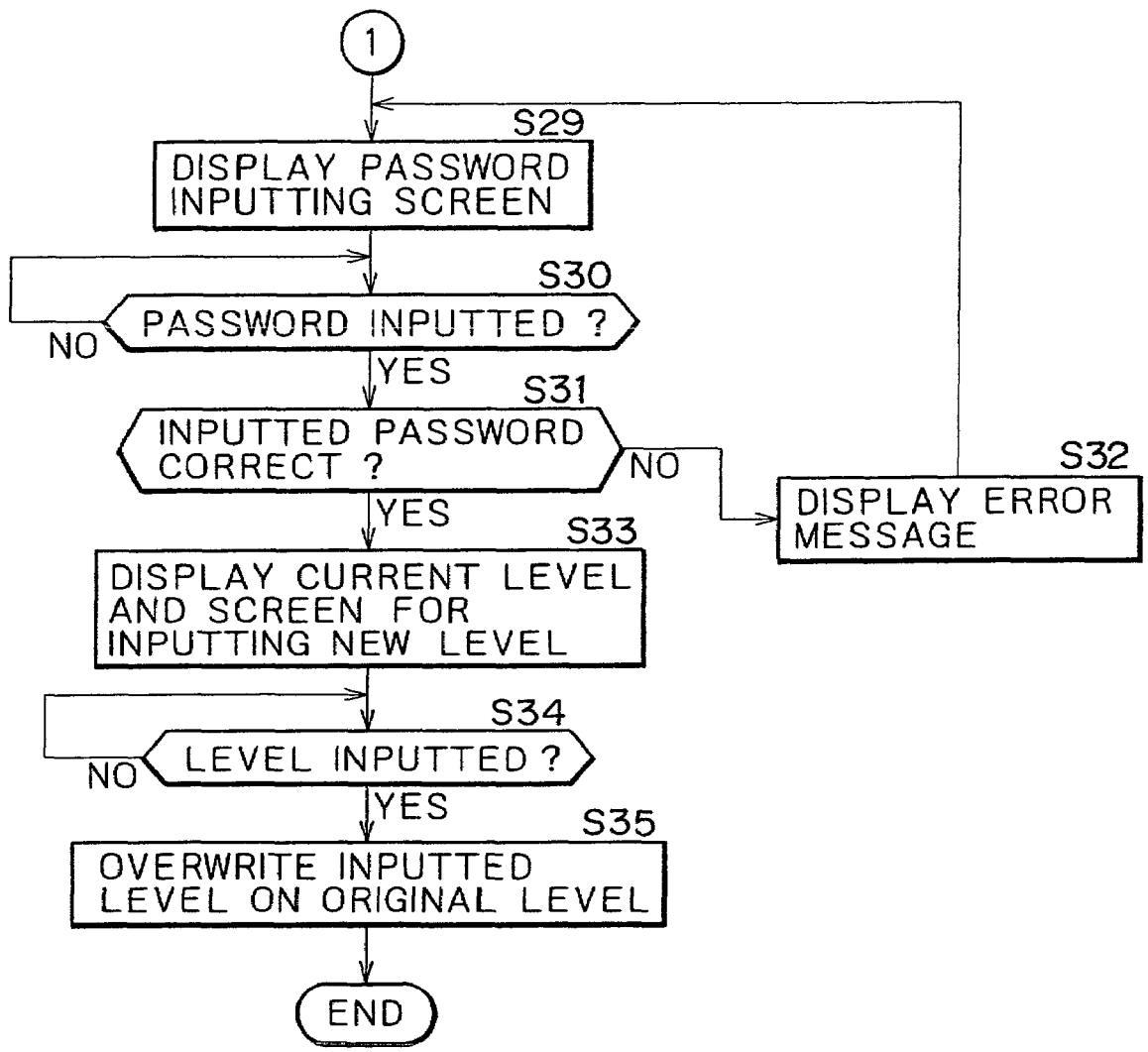

In order to change the parental level set once in this manner, the user will input the number 2 through the interface controller 3 while such a level registration menu as shown in FIG. 5 is displayed. In this instance, it is discriminated in step S23 that the item of "To change the level" is selected, and the processing advances to step S29, in which the controller 2 causes a password inputting screen to be displayed. Also data of the password inputting screen are stored in advance in the flash ROM 4. Thus, the data are supplied to the OSD control circuit 29, by which they are converted into image data, and the image data are outputted through the NTSC encoder 30 to and displayed on the display unit.

When the password inputting screen is displayed, the user will input a password set in advance through the interface controller 3. Thus, the controller 2 waits in step S30 until a password is inputted. Then, when a password is inputted, the processing advances to step S31, in which it is discriminated whether or not the inputted password is new, that is, whether or not the inputted password is identical with the password stored in the flash ROM 4.

If it is discriminated in step S31 that the inputted password is not correct, then the processing advances to step S32, in which the controller 2 executes a process for displaying an error message. In particular, such a message as, for example, "The password is wrong" stored in the flash ROM 4 is read out then and outputted from the OSD control circuit 29 through the NTSC encoder 30 to and displayed on the display unit. Thereafter, the processing returns to step S29 so that the processing beginning with step S29 is repeated.

If it is discriminated in step S31 that the inputted password coincides with the password stored in advance in the flash ROM 4, then the processing advances to step S33, in which the controller 2 reads out the level stored in the flash ROM 4 and causes the level to be displayed through the OSD control circuit 29 and the NTSC encoder 30 and further causes a screen for inputting a new level to be displayed. The user will refer to the screen and input a level for parental lock to be set newly though the interface controller 3.

Thus, the controller 2 waits in step S34 until a new level is inputted. Then, when a new level is inputted, the processing advances to step S35, in which the inputted level is written over the original level, that is, the original level is erased and the new level is stored into the flash ROM 4.

Subsequently, a processing when parental lock setting registration is performed for each DVD is described with reference to flow charts of FIGS. 7 to 11. This process is started when an instruction therefor is inputted through the interface controller 3. First in step S51 of FIG. 7, the controller 2 discriminates whether or not a disk is loaded. If no disk is loaded, then the controller 2 waits until a disk is loaded. If it is discriminated in step S51 that a disk is loaded, then the processing advances to step S52, in which the controller 2 reads a disk ID from the disk. Where the loaded disk is a DVD, the disk ID is VMGI/VMGI_MAT/VMG-EA (4 bytes) and VTSI/VTSI_MAT/VTS_EA (4 bytes) of VTS#1. However, where the loaded disk is a video CD or a music CD, the disk ID is a maximum track number and a readout starting sector number recorded in the TOC (Table Of Contents) of the disk. It is to be noted that the disk ID of the DVD is hereinafter described with reference to FIGS. 16 to 20.

Figure 12:
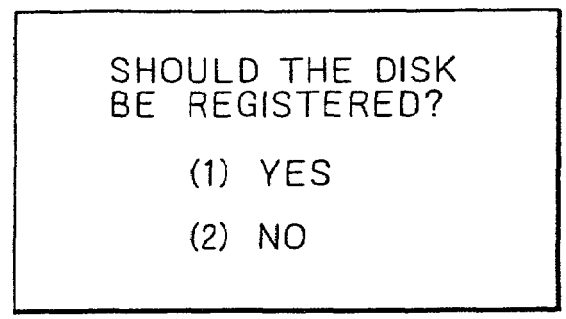
FIG. 12 is a schematic view showing an example of a disk registration menu in step S54 of FIG. 7.

In step S53, the controller 2 discriminates whether or not the disk ID read in step S52 is registered already in the flash ROM 4. If the disk ID read in step S52 is not registered in the flash ROM 4 as yet, then the processing advances to step S54, in which the controller 2 executes a process of displaying the disk registration menu. Consequently, such a menu as shown, for example, n FIG. 12 is read out from the flash ROM 4 and outputted through the OSD control circuit 29 and the NTSC encoder 30 to and displayed on the display unit. In the example shown in FIG. 12, a sentence of "Should the disk be registered?" and words of "YES" and "NO" are displayed. The user will refer to the display and input the number 1 (YES) if the disk having been loaded is to be registered, but input the number 2 (NO) if the disk having been loaded is not to be registered, through the interface controller 3.

The controller 2 discriminates in step S55 whether or not it is inputted that the disk should be registered, that is, whether or not the number 1 is inputted from the interface controller 3. If the number 1 is not inputted, that is, if the number 2 is inputted, then the controller 2 ends the parental lock setting registration process described above.

On the other hand, if the number 1 is inputted, then the processing advances to step S56, in which the password inputting screen for inputting a password to be registered is caused to be displayed by the controller 2. This password is a password regarding the disk currently loaded and is basically same as the password inputted in the processing in steps S24 and S25 of FIG. 3, but may otherwise be a different password. In step S57, the controller 2 waits until a password is inputted. When a password is inputted, the processing advances to step S58, in which the controller 2 discriminates whether or not the number of registered disk IDs in the flash ROM 4 is equal to the maximum value therefor. If the number of registered disk IDs is not equal to the maximum value, then the processing advances to step S59, in which the controller 2 stores the disk ID read in step S52 in a corresponding relationship to the password fetched in the processing in steps S56 and S57 into the table of the flash ROM 4.

On the contrary, if it is discriminated in step S58 that the registered number of disk IDs is equal to the maximum value, then the processing advances to step S60, in which the controller 2 writes the read disk ID and the password in a corresponding relationship over the oldest disk ID and the corresponding password. It is otherwise possible in step S60 to cause a list of disk IDs and passwords registered already to be displayed, urge the user to select a predetermined one of the disk IDs, erase the selected disk ID and a password corresponding to the selected disk ID and cause the new disk ID and password to be registered.

After the processing in step S59 or S60, the processing advances to step S61, in which the controller 2 causes the level inputting screen for registration of a level to be displayed. The user will refer to the level inputting screen and input a parental level to be set to the disk currently loaded through the interface controller 3. In step S62, the controller 2 waits until a level is inputted. When a level is inputted, the processing advances to step S63, in which the controller 2 stores the inputted level into the table on the flash ROM 4 in a corresponding relationship to the disk ID.

Thus, a level for parental lock and a password necessary for cancellation of the parental lock are stored for each disk into the table of the flash ROM 4 in such a manner as described above.

Figure 8:
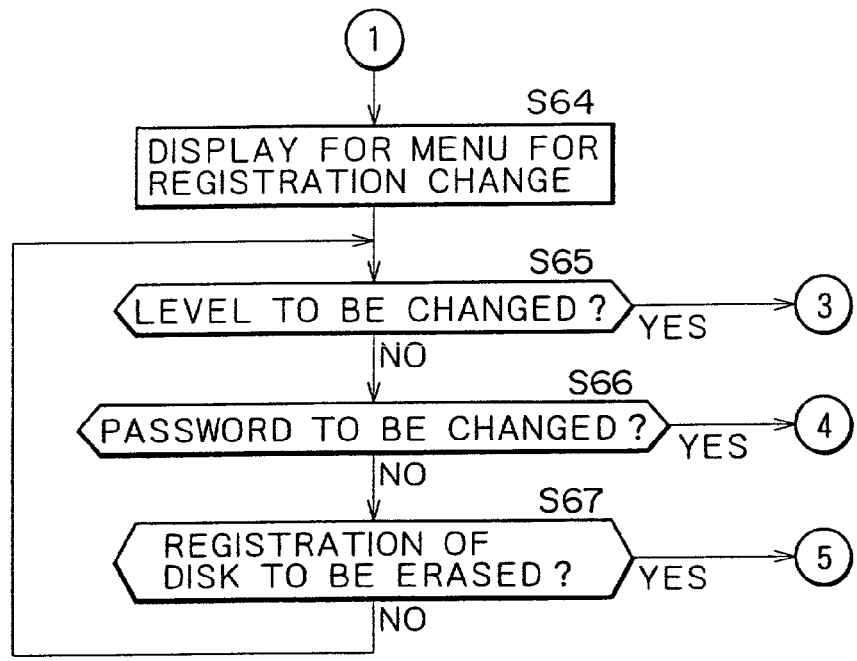
Figure 13:
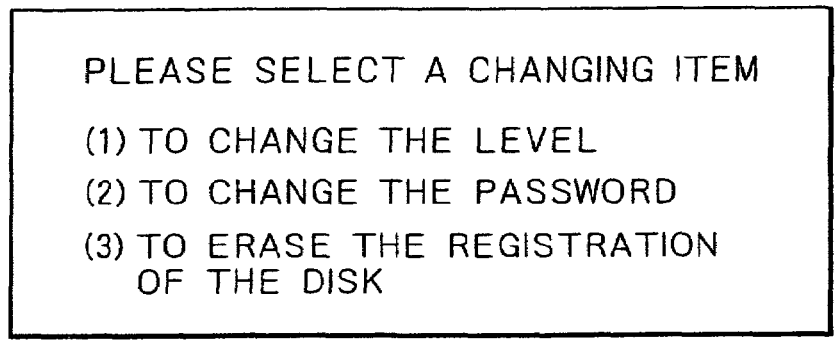
FIG. 13 is a schematic view showing an example of a registration changing menu in step S64 of FIG. 8.

On the other hand, if it is discriminated in step S53 that the disk ID read in step S52 is stored already in the table of the flash ROM 4, then the processing advances to step 64 shown in FIG. 8. Referring to now to FIG. 8, in step S64, the controller 2 causes such a registration changing menu as shown, for example, in FIG. 13 to be displayed. The menu shown in FIG. 13 allows selection of one of items of "(1) To change the level", "(2) To change the password" and "(3) To erase the registration of the disk" through the numbers 1 to 3.

Thus, the controller 2 waits in steps S65 to S67 until one of "To change the level", "To change the password" and "To erase the registration of the disk" is selected.

Figure 9:
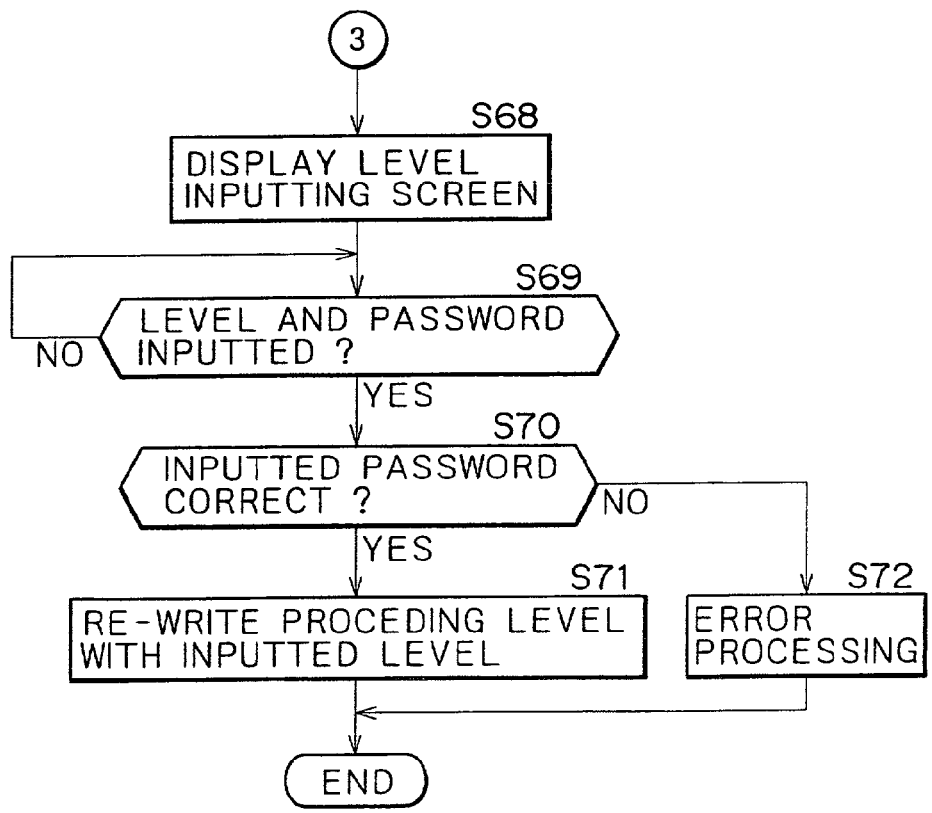

If it is discriminated in step S65 that the item of "To change the level" is selected, then the processing advances to step S68 shown in FIG. 9. Referring now to FIG. 9, in step S68, the controller 2 causes the level inputting screen to be displayed. Simultaneously, also the level of the disk registered already is displayed. The user will refer to the inputting screen and input a level to be newly set to the disk together with a password through the interface controller 3.

Thus, the controller 2 waits in step S69 until a level and a password are inputted. When a level and a password are inputted, the processing advances to step S70, in which the controller 2 discriminates whether or not the inputted password is correct, that is, whether or not the inputted password coincides with the password registered already corresponding to the disk ID. If the inputted password is correct, then the processing advances to step S71, in which the controller 2 executes a process of rewriting the preceding level with the newly inputted level. If the inputted password is not correct in step S70, then the processing advances to step S72, in which the controller 2 executes an error process. In particular, such a message as, for example, "The level cannot be changed because the password is not correct" is displayed. After the process in step S71 or S72, the processing is ended.

Figure 10:
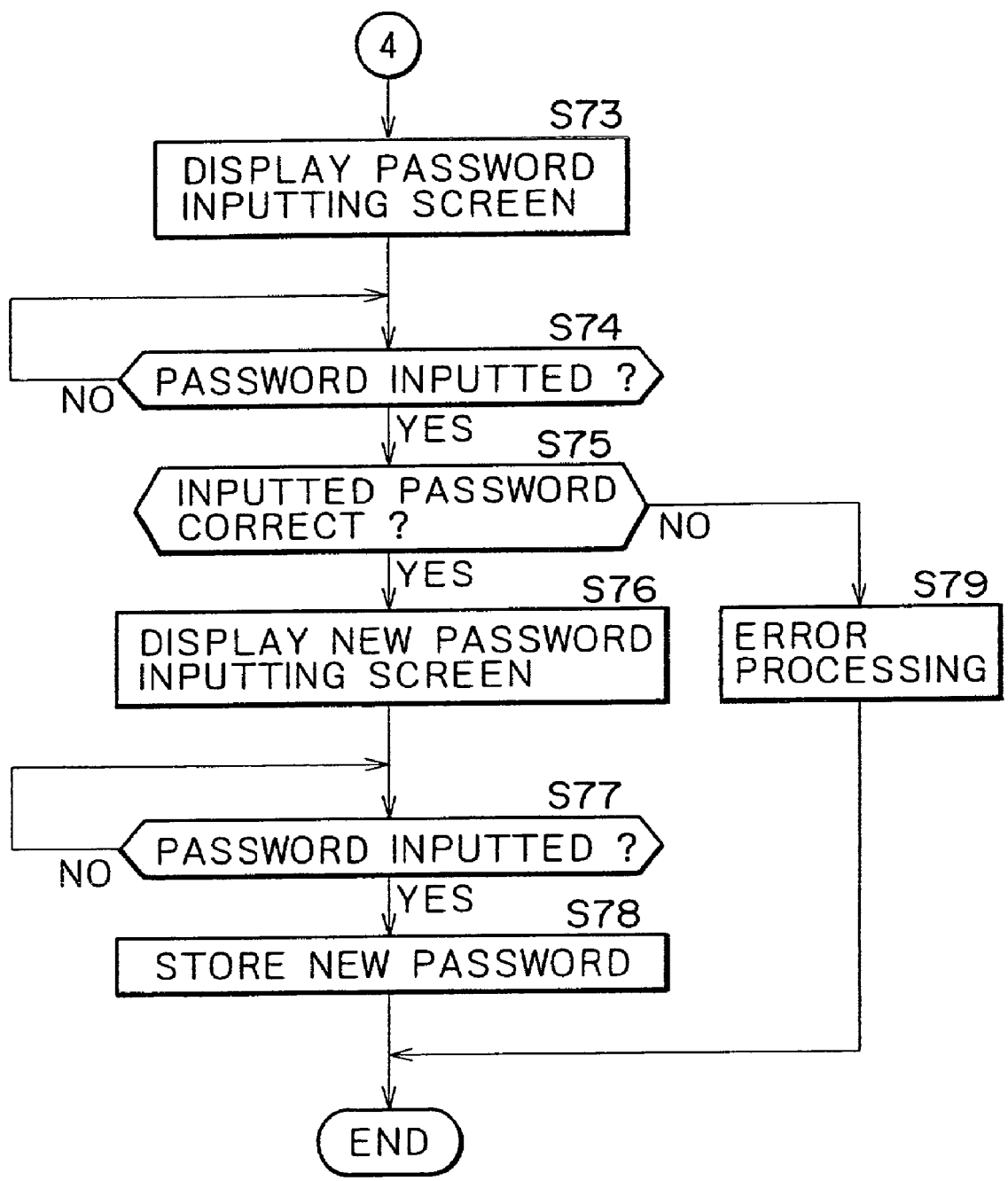

Referring back to FIG. 8, if it is discriminated in step S66 that the item of "To change the password" is selected, then the processing advances to step S73 shown in FIG. 10. Referring to FIG. 10, in step S73, the controller 2 causes the password inputting screen to be displayed. The user will refer to the password inputting screen and input a password. The controller 2 waits in step S74 until a password is inputted. If a password is inputted, then the processing advances to step S75, in which the controller 2 discriminates whether or not the inputted password is correct, that is, whether or not the inputted password coincides with the password registered already.

If it is discriminated that the inputted password is correct, then the processing advances to step S76, in which the controller 2 causes a new password inputting screen to be displayed. The user will input a new password in response to the password inputting screen. In step S77, the controller 2 waits until a new password is inputted. Then, when a new password is inputted, the processing advances to step S78, in which the original password is erased and the new password is stored in a corresponding relationship to the disk ID of the disk currently loaded.

Conversely, if it is discriminated in step S75 that the inputted password is not correct, then the controller 2 executes an error process in step S79. In this instance, such a message as, for example, "The password cannot be changed because the inputted password is not correct" is displayed. After the processing in step S78 or S79, the controller 2 ends its processing.

Figure 11:
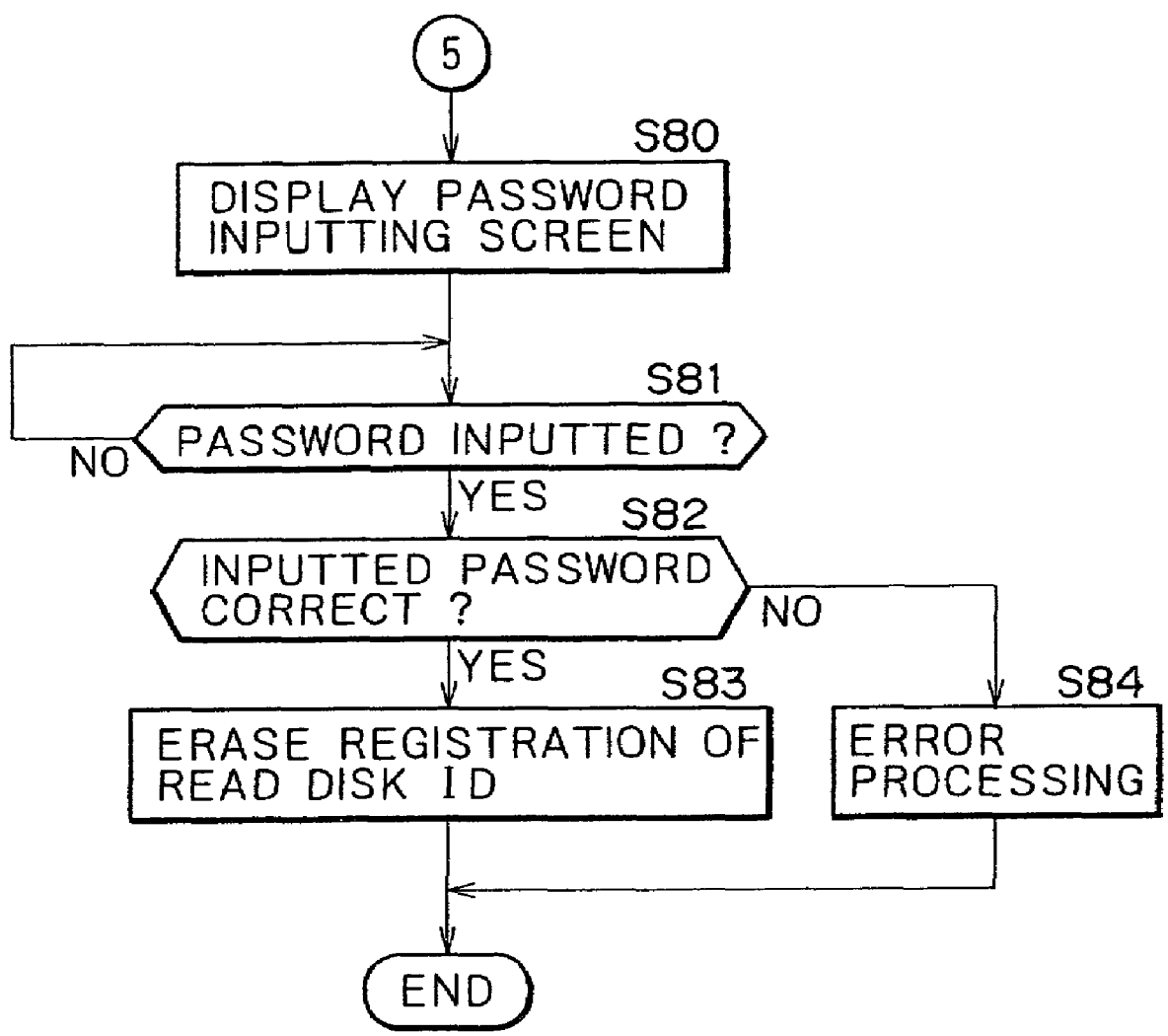

Referring back again to FIG. 8, if it is discriminated in step S67 that the item of "To erase the registration of the disk" is selected, then the processing advances to step S80 shown in FIG. 11. Referring to FIG. 11, the controller 2 causes the password inputting screen to be displayed in step S80. The user will input a password in response to the password inputting screen. In step S81, the controller 2 waits until a password is inputted. Then, when a password is inputted, the processing advances to step S82, in which the controller 2 discriminates whether or not the inputted password is correct, that is, whether or not the inputted password coincides with the password registered already. If the inputted password is correct, then the processing advances to step S83, in which the controller 2 erases the registration of the read disk ID and the corresponding level and password.

If it is discriminated in step S82 that the inputted password is not correct, then the processing advances to step S84, in which the controller 2 executes an error process. At this time, such a message as, for example, "The registration of the disk cannot be erased because the password is not correct" is displayed.

Figure 15:
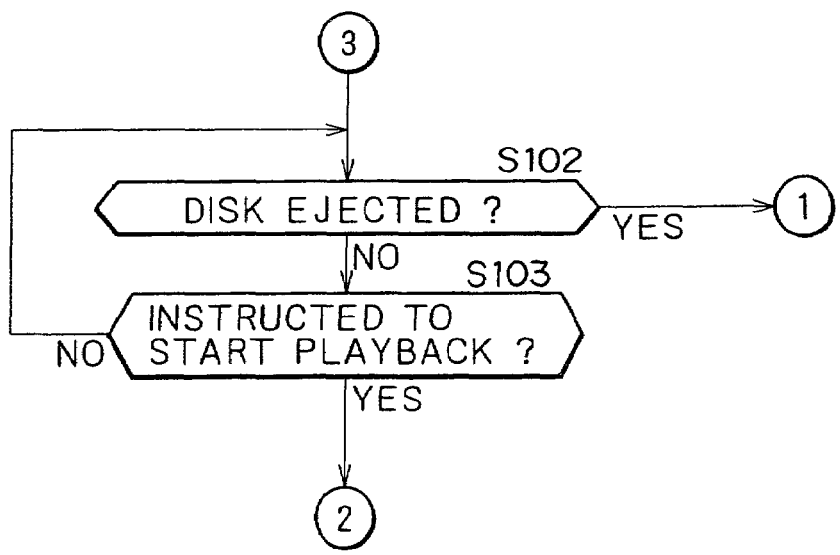
FIGS. 14 and 15 are flow charts illustrating a playback process of the DVD player of FIG. 3.

Subsequently, a playback process executed by the controller 2 is described with reference to the flow charts of FIGS. 14 and 15. The present process is started when power supply to the DVD player 1 is made available.

Figure 14:
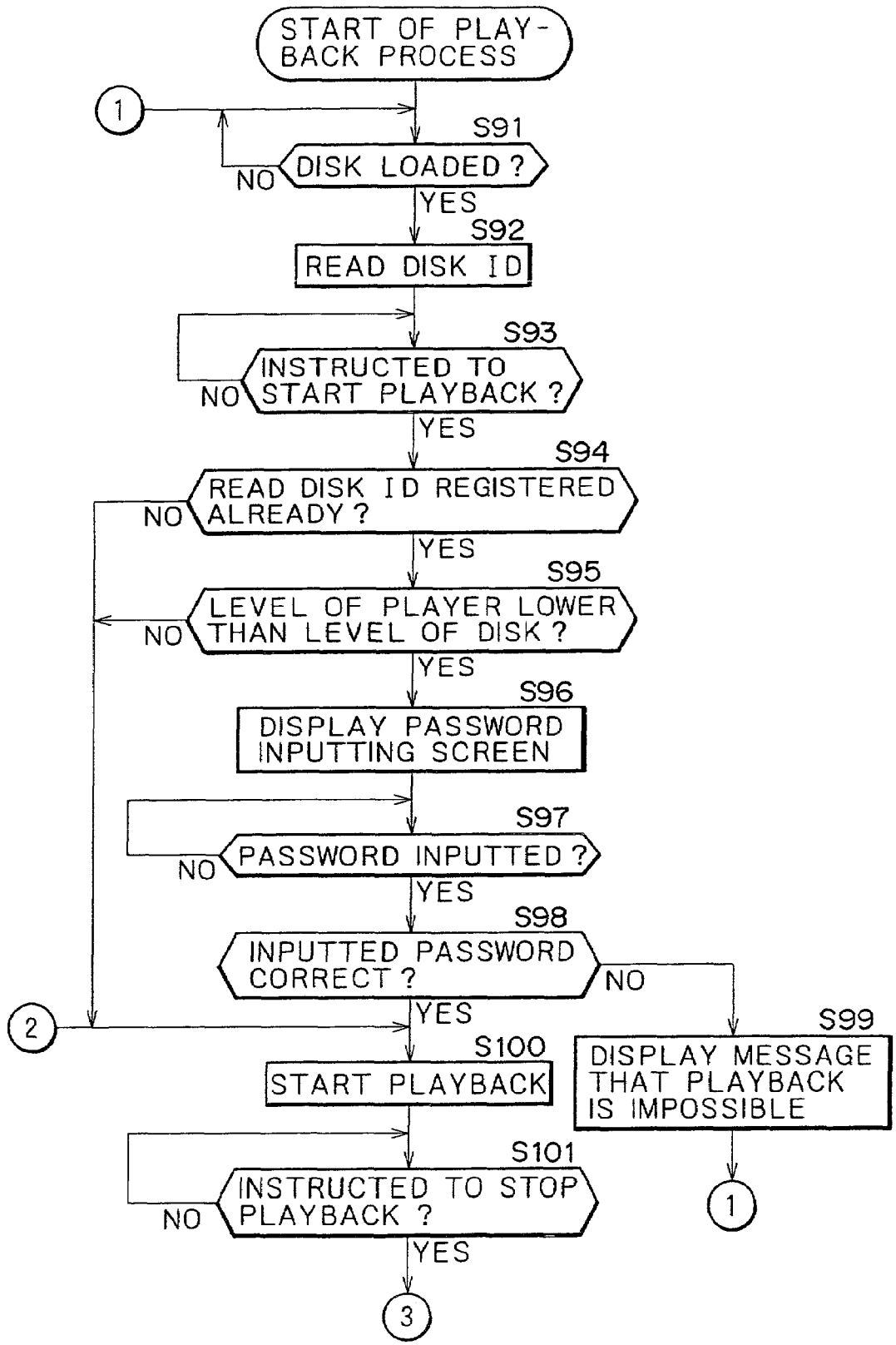

Referring first to FIG. 14, first in step S91, the controller 2 waits until a disk is loaded. When it is discriminated that a disk is loaded, the processing advances to step S92, in which the controller 2 reads the disk ID of the loaded disk. In step S93, the controller 2 discriminates whether or not an instruction to start a playback process is inputted by a user through the interface controller 3. If an instruction to start a playback process is not inputted, then the controller 2 waits until such an instruction is inputted.

Figure 4:
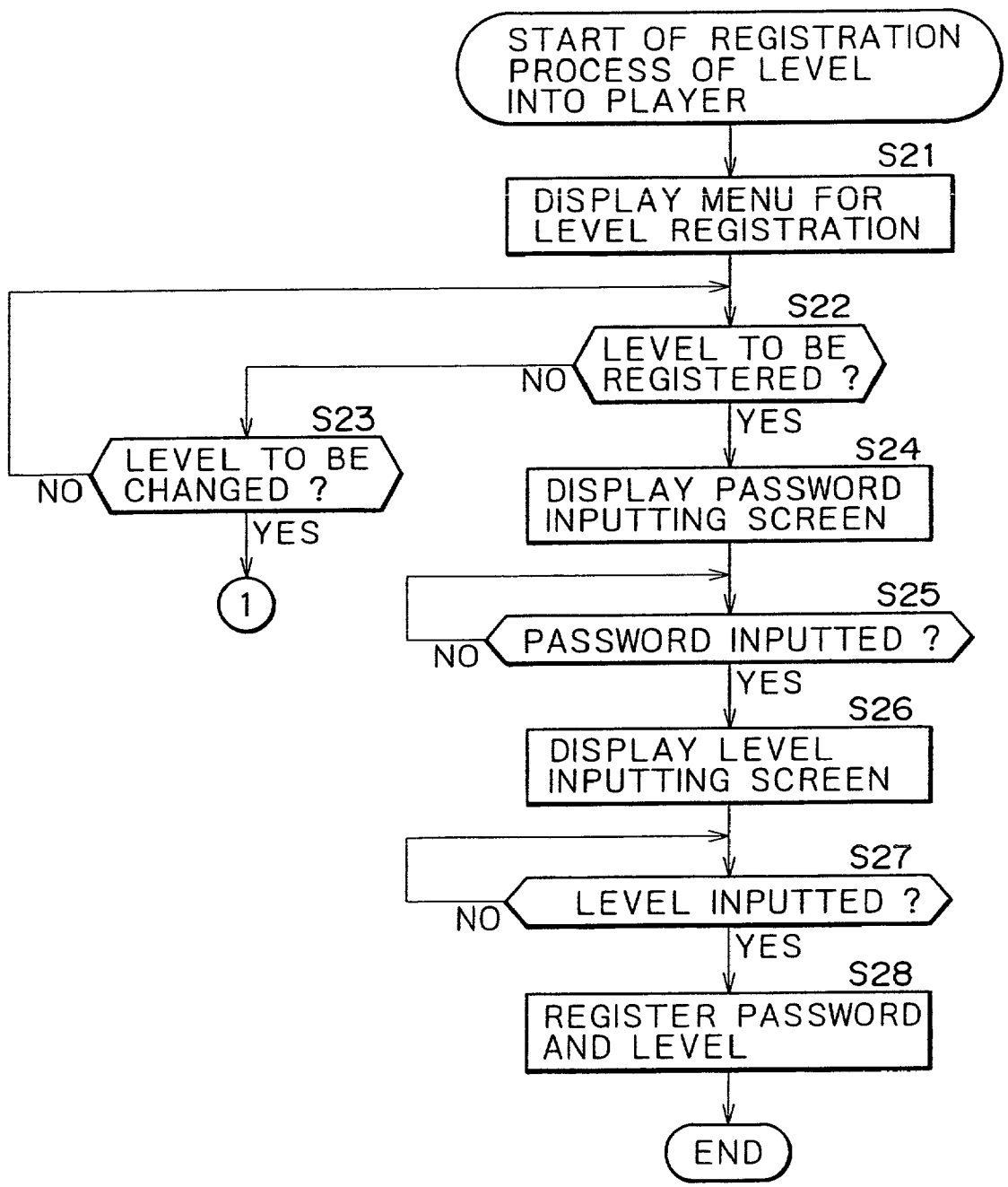
FIGS. 4 and 5 are flow charts illustrating a level registration process of the DVD player of FIG. 3.

If it is discriminated in step S93 that an instruction to start playback is inputted, then the processing advances to step S94, in which the controller 2 discriminates whether or not the disk ID read in step S92 is registered already in the flash ROM 4. If the read disk ID is registered already, then the processing advances to step S95, in which the controller 2 discriminates whether or not the level of the player set already to the DVD player 1, that is, the level registered in step S28 of FIG. 4, is lower than the level stored corresponding to the disk ID read in step S92, that is, whether or not the parental level of the player is severer than that of the disk.

If the level of the DVD player 1 is lower than the level of the disk, that is, if the parental level of the player is severer than that of the disk, then the processing advances to step S96, in which the controller 2 causes the password inputting screen to be displayed. At this time, the user will input a password through the interface controller 3. In step S97, the controller 2 waits until a password is inputted. Then, when a password is inputted, the processing advances to step S98, in which the controller 2 discriminates whether or not the inputted password is correct. If the inputted password is not correct, then the processing advances to step S99, in which the controller 2 causes a message representing that intended playback is impossible to be displayed. In this instance, such a message as, for example, "This disk cannot be played back" is displayed. Thereafter, the processing returns to step S91 so that the processing in steps S91 et seq. described above is repetitively executed.

Thus, a child who does not know the password cannot play back the disk to which restriction to enjoyment is applied in this manner, that is, enjoyment of the disk by a child is inhibited.

If it is discriminated in step S98 that the inputted password is correct, then the processing advances to step S100, in which the controller 2 causes playback of the disk currently loaded to be started.

If it is discriminated in step S94 that the read disk ID is not registered as yet, or if it is discriminated that the level of the player is not lower than the level of the disk, then since enjoyment of the disk need not be restricted, the processing in steps S96 to S98 is skipped, but the processing is advanced directly to step S100, in which playback is started immediately.

After playback of the disk is started, for example, a playback signal read from the DVD video 6 by the pickup 7 is inputted to the RF amplifier 9. The RF amplifier 9 digitizes the RF signal inputted thereto from the pickup 7 and outputs the digital signal to the PLL circuit 10. The PLL circuit 10 supplies the digital signal from the RF amplifier 9 to the EFM+demodulation circuit 11, and produces a clock signal from the digital signal and supplies also the clock signal to the EFM+demodulation circuit 11.

The EFM+demodulation circuit 11 demodulates the digital signal inputted thereto in synchronism with the clock signal inputted thereto and supplies a result of the demodulation to the microcomputer 12. The microcomputer 12 performs an error correction process by means of the code error detection circuit 14 and the code error correction circuit 15 thereof and supplies resulting demodulation data to the demultiplexing circuit 19. Where the disk played back by the pickup 7 is a CD, the playback signal read from the CD is decoded by the CD-ROM decoder 16 and then supplied to the demultiplexing circuit 19.

The demultiplexing circuit 19 supplies video data to the video decoder 22 and supplies audio data to the audio decoder 20. The audio decoder 20 decodes the audio data inputted thereto and supplies resulting audio data to the DAC 28. The DAC 28 converts the digital audio data inputted thereto into an analog audio signal and outputs the analog audio signal to a speaker or a like element not shown.

The video decoder 22 decodes the video data inputted thereto and outputs the decoded video data to the letter box conversion circuit 23. The letter box conversion circuit 23 converts the data inputted thereto from the audio decoder 20 into data of an aspect ratio of the letter box and outputs the resulting data to the NTSC encoder 30. The NTSC encoder 30 converts the video data inputted thereto into a video signal of the NTSC system and outputs the video signal of the NTSC system to the display unit so as to be displayed on the display unit.

While playback is proceeding in such a manner as described above, the controller 2 discriminates in step S101 through the interface controller 3 whether or not an instruction to stop the playback is inputted. The controller 2 waits until an instruction to stop the playback is inputted. When an instruction to stop the playback is inputted, the processing advances to step S102 shown in FIG. 15. Referring now to FIG. 15, in step S102, the controller 2 discriminates whether or not the disk is ejected. If the disk is not ejected, then the processing advances to step S103, in which the controller 2 discriminates whether or not an instruction to start playback is inputted again.

If it is discriminated in step S103 that an instruction to start playback is not inputted, then the processing returns to step S102 so that the processing in steps S102 et seq. is repetitively executed.

If it is discriminated in step S103 that an instruction to start playback is inputted, then the processing returns to step S100 of FIG. 14, in which playback of the disk is started. Thereafter, such processing as described above is executed again.

If it is discriminated in step S102 that the disk is ejected, then the processing returns to step S91 of FIG. 14 so that the processing in steps S91 et seq. is repeated. Thus, in this instance, processing similar to that which is executed when a new disk is loaded is executed again.

Thus, once a password is inputted first, the user can repetitively perform playback of a disk without inputting the password every time unless the disk loaded once is ejected. If the disk is ejected once, then when the disk is loaded again, the user is requested to input a password again. Therefore, even if power supply to the DVD player 1 is disconnected, only if a disk is ejected, otherwise possible inadvertent enjoyment of the disk by a child can be prevented.

Subsequently, a disk ID of the DVD video 6 is described with reference to FIGS. 16 to 20.

Figure 16:
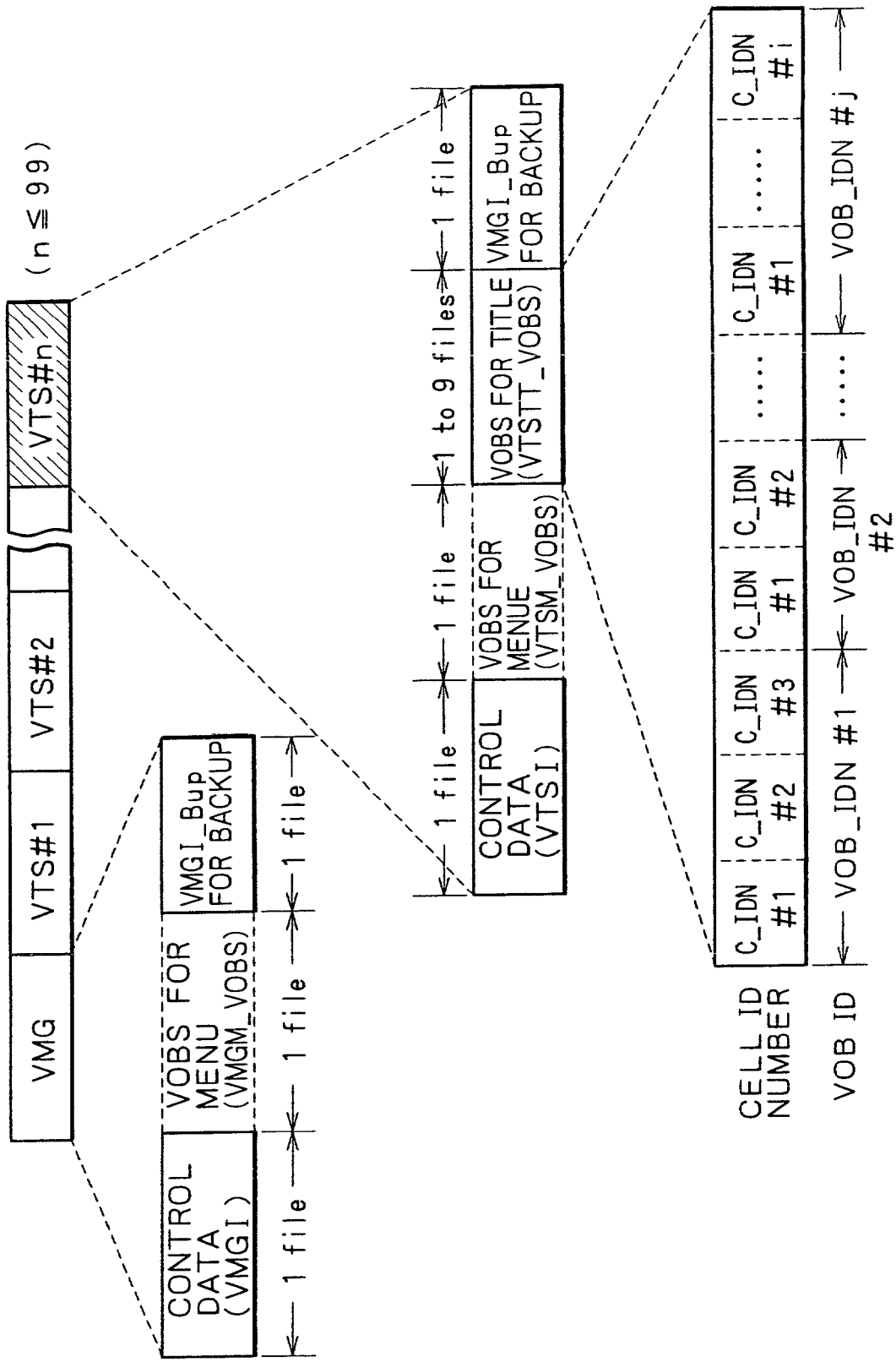
FIG. 16 is a schematic view illustrating a format of video contents of a DVD video shown in FIG. 3.

As shown in FIG. 16, contents recorded on the DVD video 6 include a single video manager (VMG) of a logic unit, and a plurality of (equal to or less than 99) video title sets (VTSs). The video manager is a logic unit for forming a table of contents which specifies all titles present on the DVD. Also a system menu for selection of a title using a picture, an opening message and so forth can be recorded in the video manager. A video title set is a logic unit for forming a single title or a plurality of titles which commonly share part of video data in order to be ready for a plurality of parental levels. Also it is possible to record a system menu which uses a picture relating to a title for selection of an audio language/sub-video language, for selection of a chapter or the like in a video title set.

The video manager includes control data (video manager information (VMGI)) including navigation data, a video object set for a menu (VMGM_VOBS) and control data for backup (VMGI_BUP). A video title set includes control data (video title set information (VTSI)) including navigation data, a video object set for a menu (VTSM_VOBS), a video object set for a title (VTSTT_VOBS) and control data for backup (VTSI_BUP).

A video object set includes one or more video objects (VOBs), and a video object includes one or more cells. A cell is a scene in a title decided by a producing person of the contents and is a basic unit for playback of a title. A playback path of a title is determined by definition of an order in which such cells are to be played back.

Referring to FIG. 17, the video manager information (VMGI) includes a video manager information management table (VMGI_MAT), a title search pointer table (TT_SRPT), a video manager menu PGCI unit table (VMGM_PGCI_UT), a parental management information table (PTL_MAIT), a video title set attribute information table (VTS_ATRT), a text data manager (TXTDT_MG), a vide manager menu cell address table (VMGM_C_ADT) and a video manager menu video object unit address map (VMGM_VOBU_ADMAP).

Of the components of the video manager information (VMGI) mentioned above, the video manager information management table (VMGI_MAT) includes a VMG identifier (VMG_ID), a VMG end address (VMG_EA) and so forth as seen in FIG. 18. In the present embodiment, the VMG end address (VMG_EA) of 4 bytes is used as part of the disk ID.

Meanwhile, as seen in FIG. 19, the video title set information (VTSI) includes a video title set information management table (VTSI_MAT), a video title set PTT search pointer table (VTS_PTT_SRPT), a video title set program chain information table (VTS_PGCIT), a video title set menu PGCI unit table (VTSM_PGCI_UT), a video title set time map table (VTS_TMAPT), a video title set cell address table (VTSM_C_ADT), a video title set menu video object unit address map (VTSM_VOBU_ADMAP), a video title set cell address table (VTS_C_ADT) and a video title set video object unit address map (VTS_VOBU_ADMAP).

Of the components of the video title set information (VTSI) mentioned above, the video title set information management table (VTSI_MAT) includes a VTS identifier (VTS_ID), a VTS end address (VTS_EA) and so forth as seen in FIG. 20. Of the components of the video title set information management table (VTSI_MAT), the VTS end address (VTS_EA) of 4 bytes is used as part of the disk ID of the DVD. Accordingly, the disk ID of the DVD is composed of totaling 8 bytes of VMG_EA and VTS_EA.

The VGM end address (VMG_EA) and the VTS end address (VTS_EA) may theoretically be same between different disks. Actually, however, the values are in most cases different among different disks. Therefore, each disk can be identified substantially based on data of the totaling 8 bytes.

Figure 1:
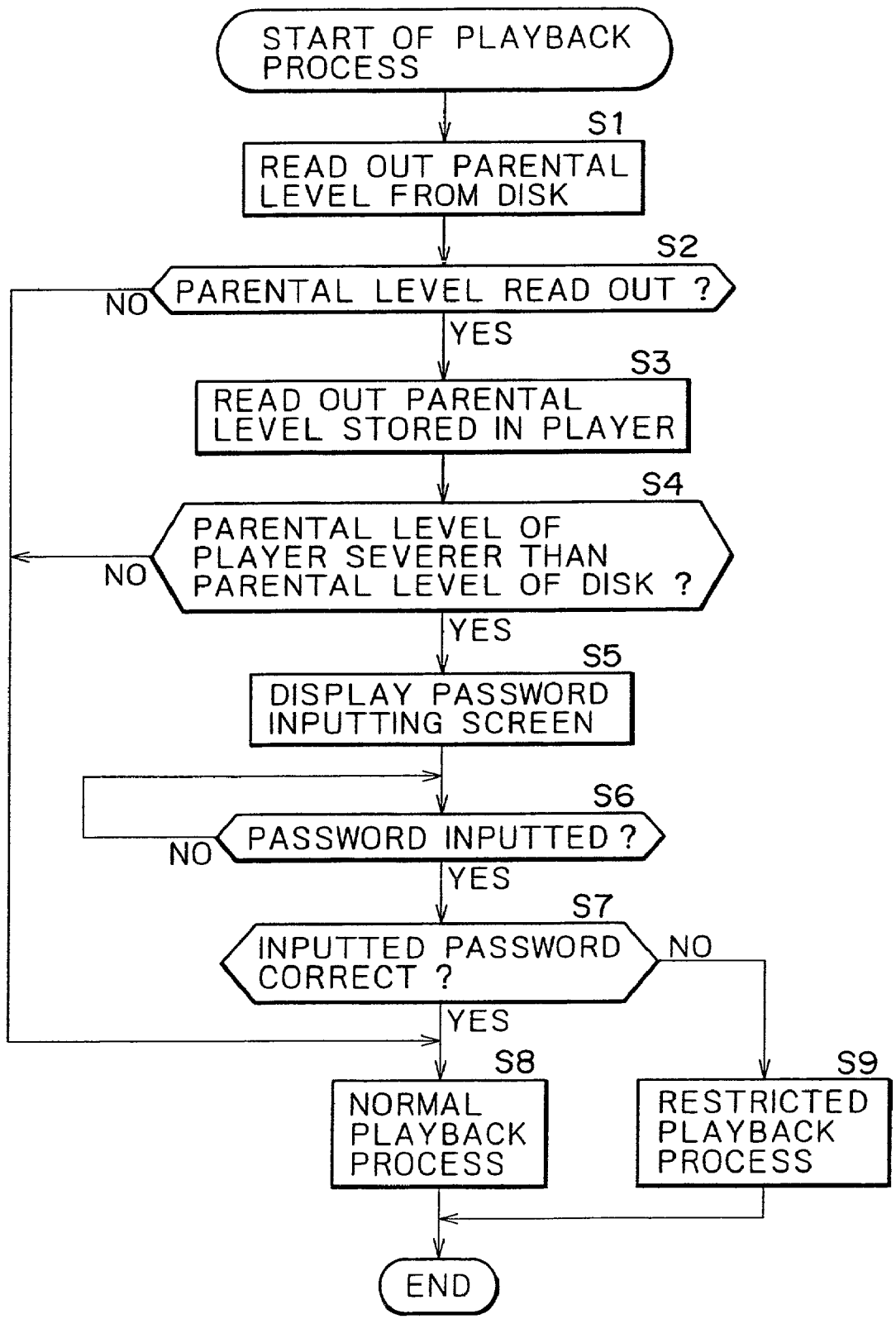
FIG. 1 is a flow chart illustrating a playback process of a conventional DVD player.
Figure 2:
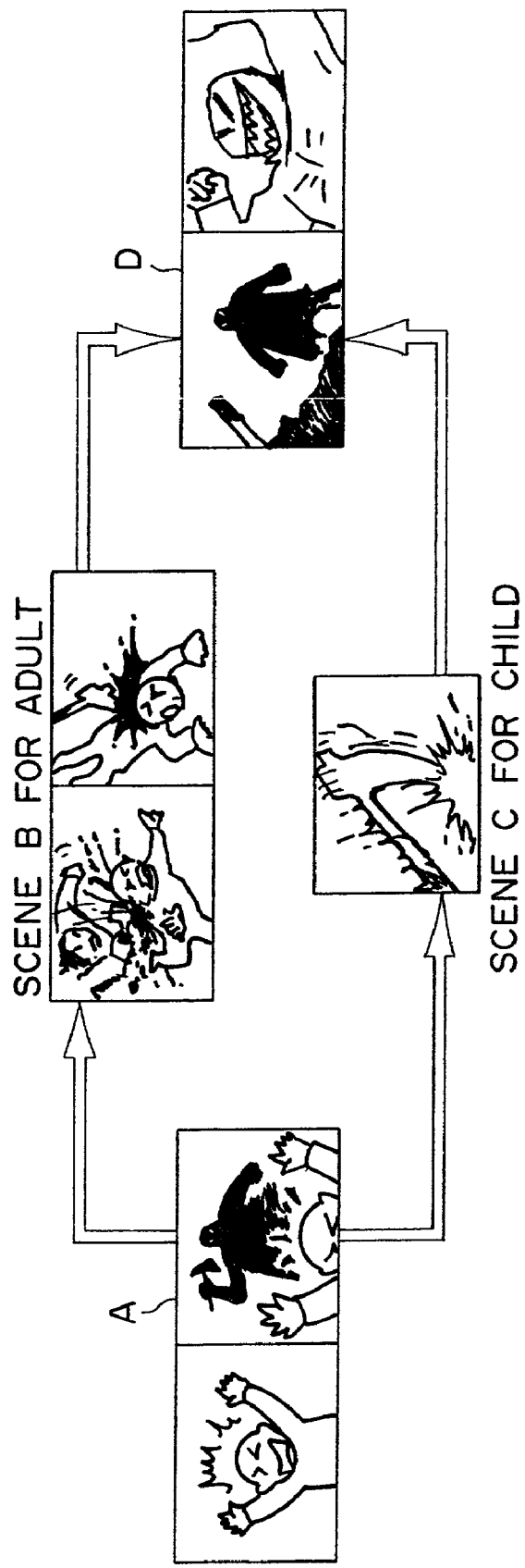
FIG. 2 is a schematic view illustrating a function of parental lock.

Naturally, data different from those described above may be utilized as a disk ID. It is to be noted that, where a parental level is recorded on a DVD itself, also the DVD player 1 of FIG. 3 performs processing similar to that described hereinabove with reference to FIG. 1.

While the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

The recording medium is formed as a package medium such as, as shown in FIG. 3, a magnetic disk 51 (including a floppy disk), an optical disk 52 (including a CD-ROM (Compact Disk-Read Only Memory) and a DVD (Digital Versatile Disk)), a magneto-optical disk 53 (including an MD (Mini-Disk)), or a semiconductor memory 54 which has the program recorded thereon or therein and is distributed separately from a computer in order to provide the program to a user, or as a flash ROM 4 or a hard disk which has the program recorded therein and is provided to a user in a form wherein it is incorporated in a computer.

It is to be noted that, in the present specification, the steps which describe the program recorded in or on a recording medium may be but need not necessarily be processed in a time series in the order as described, and include processes which are executed parallelly or individually without being processed in a time series.

Further, in the present specification, the term "system" is used to represent an entire apparatus composed of a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. An information playback apparatus for playing back a recording medium on which image information is recorded, comprising:
    first fetching means for fetching identification information, input by a user, used for identification of a recording medium;
    second fetching means for fetching a permission condition, input by the user, for permitting playback of the image information recorded on a recording medium;
    storage means for storing the identification information fetched by said first fetching means and the permission condition fetched by said second fetching means;
    extraction means for extracting the identification information recorded on a recording medium loaded in said information playback apparatus;
    first comparison means for comparing the identification information extracted by said extraction means and the identification information stored in said storage means with each other;
    third fetching means for fetching a permission condition when the identification information extracted by said extraction means and the identification information stored in said storage means coincide with each other;
    second comparison means for comparing the permission condition fetched by said third fetching means and the permission condition stored in said storage means with each other; and
    control means for controlling playback of the image information recorded on the recording medium in response to a result of the comparison by said second comparison means,
    wherein said user is able to increase a value of said identification information, input by a user, used for identification of a recording medium and a value of said identification information recorded on a recording medium loaded in said information playback apparatus,
    wherein the increased values of the identification information are written over original values of the identification information in the storage means, and
    wherein, if a maximum of identification information is achieved the new identification information is written over a user-selected replaceable identification information.

2. An information playback apparatus according to claim 1, wherein the permission condition includes a password.

3. An information playback apparatus according to claim 1, wherein the permission condition includes a parental level.

4. An information playback method for an information playback apparatus which plays back a recording medium on which image information is recorded, comprising:
    a first fetching step of fetching identification information, input by a user, used for identification of a recording medium;
    a second fetching step of fetching a permission condition, input by the user, for permitting playback of the image information recorded on a recording medium;
    a storage control step of controlling storage of the identification information fetched by the first fetching step and the permission condition fetched by the second fetching step;

an extraction step of extracting the identification information recorded on a recording medium loaded in said information playback apparatus;
a first comparison step of comparing the identification information extracted by the extraction step and the identification information whose storage has been controlled by the storage control step with each other;
a third fetching step of fetching a permission condition when the identification information extracted by the extraction step and the identification information whose storage has been controlled by the storage control step coincide with each other;
a second comparison step of comparing the permission condition fetched by the third fetching step and the permission condition whose storage has been controlled by the storage control step with each other; and
a control step of controlling playback of the image information recorded on the recording medium in response to a result of the comparison by the second comparison step,
wherein said user is able to increase a value of said identification information, input by a user, used for identification of a recording medium and a value of said identification information recorded on a recording medium loaded in said information playback apparatus,
wherein the increased values of the identification information are written over original values of the identification information in the storage control step, and
wherein, if a maximum of identification information is achieved, new identification information is written over a user-selected replaceable identification information.

5. A recording medium on which a computer-readable program for information playback for an information playback apparatus which plays back an information recording medium on which image information is recorded is recorded, the program comprising:
a first fetching step of fetching identification information, input by a user, used for identification of an information recording medium;
a second fetching step of fetching a permission condition, input by the user, for permitting playback of the image information recorded on an information recording medium;
a storage control step of controlling storage of the identification information fetched by the first fetching step and the permission condition fetched by the second fetching step;
an extraction step of extracting the identification information recorded on an information recording medium loaded in said information playback apparatus;
a first comparison step of comparing the identification information extracted by the extraction step and the identification information whose storage has been controlled by the storage control step with each other;
a third fetching step of fetching a permission condition when the identification information extracted by the extraction step and the identification information whose storage has been controlled by the storage control step coincide with each other;
a second comparison step of comparing the permission condition fetched by the third fetching step and the permission condition whose storage has been controlled by the storage control step with each other; and
a control step of controlling playback of the image information recorded on the information recording medium in response to a result of the comparison by the second comparison step,
wherein said user is able to increase a value of said identification information, input by a user, used for identification of a recording medium and a value of said identification information recorded on an information recording medium loaded in said information playback apparatus,
wherein the increased values of the identification information are written over original values of the identification information in the storage control step, and
wherein, if a maximum of identification information is achieved, new identification information is written over a user-selected replaceable identification information.

6. An information playback apparatus for playing back a recording medium on which image information is recorded, comprising:
first fetching means for fetching from a store in said playback apparatus user-programmable viewing permission information, input by a user, for controlling playback from said recording medium;
second fetching means for fetching a permission condition, input by a user, for permitting playback of the image information recorded on said recording medium;
storage means for storing the viewing permission information and the permission condition;
comparison means for comparing the viewing permission information and the permission condition with each other; and
control means for controlling playback of the image information recorded on the recording medium as a function of the comparison means,
wherein said user is able to increase a value of said user-programmable viewing permission information, input by a user, for controlling playback from said recording medium and a value of said permission condition, input by a user, for permitting playback of the image information recorded on said recording medium,
wherein the increased values of the user-programmable viewing permission information and the permission condition are written over original values of user-selected user-programmable viewing permission information and the permission condition in the storage means, and
wherein, if a maximum of identification information is achieved, new identification information is written over a user-selected replaceable identification information.

7. The information playback apparatus according to claim 6, wherein the permission condition derived from said recording medium is afforded a higher weighting than the viewing permission information.

8. A method for controlling playback of a recording medium comprising:
establishing a permission condition associated with a playback device, as a function of first input by a user;
storing the permission condition;
establishing a recording medium identification for each of one or more recording media, as a function of second input by the user;
storing the recording medium identification for each of the one or more recording media; and
comparing the stored permission condition and the stored recording medium identification for a particular recording medium,
wherein when the permission condition satisfies a predetermined relationship with the recording medium identification, a valid password, input by a user, is required to initiate playback of the particular recording medium, wherein said user is able to increase a value of said permission condition associated with said playback device and a value of said recording medium identification for each of said one or more recording media, wherein the increased value of said permission condition is written over original value of the permission condition in storage, and wherein, if a maximum of the recording medium identification information is achieved, new recording medium identification information is written over a user-selected replaceable recording medium identification information.

9. The method according to claim 8, wherein the permission condition includes a password.

10. The method according to claim 8, wherein the permission condition includes a parental level.

11. The method according to claim 8, further comprising:
determining an eject condition; and
requiring the user to provide the valid password to initiate playback of the particular recording medium following the eject condition.

12. The method according to claim 8, further comprising storing a parental level and password for each of the one or more recording media.

13. An information playback apparatus for playing back a recording medium on which image information is recorded, comprising:
means for establishing a permission condition associated with a playback device, as a function of first input by a user;
means for storing the permission condition;
means for establishing a recording medium identification for each of one or more recording media, as a function of second input by the user;
means for storing the recording medium identification for each of the one or more recording media;
means for comparing the stored permission condition and the stored recording medium identification for a particular recording medium; and
means for controlling the playback of the particular recording medium wherein when the permission condition satisfies a predetermined relationship with the recording medium identification, a valid password, input by a user, is required to initiate playback of the particular recording medium, wherein said user is able to increase a value of said permission condition associated with said playback device and a value of said recording medium identification for each of said one or more recording media, wherein the increased value of said permission condition is written over original value of the permission condition in the means for storage, and wherein, if a maximum of the recording medium identification is achieved, new recording medium identification is written over a user-selected replaceable recording medium identification.

14. The apparatus according to claim 13, wherein the permission condition includes a password.

15. The apparatus according to claim 13, wherein the permission condition includes a parental level.

16. The apparatus according to claim 13, further comprising:
means for determining an eject condition,
wherein the means for controlling require the valid password to initiate playback of the particular recording medium following the eject condition.

17. The apparatus according to claim 13, further comprising means for storing a parental level and password for each of the one or more recording media.

* * * * *